United States Patent
Lahr et al.

(10) Patent No.: US 12,351,719 B2
(45) Date of Patent: Jul. 8, 2025

(54) WATER-BASED WASHABLE PRINTING INKS FOR RECYCLED PLASTICS

(71) Applicant: SUN CHEMICAL CORPORATION, Parsippany, NJ (US)

(72) Inventors: Alexander Lahr, Charlotte, NC (US); Bruce Marshall, Charlotte, NC (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 18/572,151

(22) PCT Filed: Jun. 28, 2022

(86) PCT No.: PCT/US2022/035309
§ 371 (c)(1),
(2) Date: Dec. 19, 2023

(87) PCT Pub. No.: WO2023/278440
PCT Pub. Date: Jan. 5, 2023

(65) Prior Publication Data
US 2024/0301224 A1 Sep. 12, 2024

Related U.S. Application Data

(60) Provisional application No. 63/216,598, filed on Jun. 30, 2021.

(51) Int. Cl.
C09D 11/107 (2014.01)
C09D 11/033 (2014.01)
C09D 11/037 (2014.01)

(52) U.S. Cl.
CPC .......... C09D 11/107 (2013.01); C09D 11/033 (2013.01); C09D 11/037 (2013.01)

(58) Field of Classification Search
CPC .... C09D 11/107; C09D 11/033; C09D 11/037
USPC ........................................................ 264/139
See application file for complete search history.

(56) References Cited

U.S. PATENT DOCUMENTS

| 6,147,041 A | 11/2000 | Takahashi |
| 2017/0275483 A1 | 9/2017 | Deighton |
| 2019/0077071 A1* | 3/2019 | Ware .................. C09D 11/101 |

FOREIGN PATENT DOCUMENTS

| EP | 0 924 678 A2 | 6/1999 |
| EP | 2 847 257 A1 | 3/2015 |
| EP | 2987822 | 2/2016 |
| GB | 2045768 | 11/1980 |
| JP | 2001 350411 A | 12/2001 |
| JP | 2017 114930 A | 6/2017 |
| WO | WO 2018/075487 A1 | 4/2018 |
| WO | WO 2021/081288 | 1/2023 |

OTHER PUBLICATIONS

International Search Report issued in International Application No. PCT/US2022/035309, mailed Oct. 24, 2022.
Written Opinion of the International Searching Authority issued in International Application No. PCT/US2022/035309, mailed Oct. 24, 2022.
International Preliminary Report on Patentability (Chapter 1 of the Patent Cooperation Treaty) issued in International Application No. PCT/US2015/019210, mailed Dec. 5, 2023.

* cited by examiner

*Primary Examiner* — Christina A Johnson
*Assistant Examiner* — Xue H Liu
(74) *Attorney, Agent, or Firm* — Marian E Fundytus; Amster Rothstein & Ebenstein LLP

(57) ABSTRACT

Method for recycling printed plastic articles without contaminating or staining the recycled plastic with color due the printed ink. The ink is a water-based composition comprising select self-crosslinking acrylate copolymers or polyurethane resins, which inks exhibit good adhesion under conditions of use, but which are readily removed as solid particles when exposed to a hot caustic solution. Due to the inks being removed as solid particles, and not dissolving into the ink, the recycled plastic remains uncontaminated by the ink during recycling.

18 Claims, No Drawings

WATER-BASED WASHABLE PRINTING INKS FOR RECYCLED PLASTICS

CROSS REFERENCE TO RELATED APPLICATIONS

The present application is a § 371 National Phase application based on PCT/US2022/035309 filed Jun. 28, 2022, which claims the benefit of U.S. Provisional Application No. 63/216,598, filed Jun. 30, 2021 the subject matter of each of which is incorporated by reference in their entirety.

FIELD OF THE INVENTION

The present invention provides a method for recycling printed plastic containers without contaminating the recycled plastic with colorants or other components of the ink. In the method, certain water-based inks comprising self-crosslinking acrylate co-polymers or select polyurethane resins are used to print on the container or label, which inks exhibit good adhesion under conditions of use, but which are readily removed as solid particles when exposed to a hot caustic solution.

BACKGROUND OF THE INVENTION

Polyethylene terephthalate (PET) is widely used in the production of plastic food and beverage containers, e.g., PET bottles, and other consumer products. PET has largely replaced other plastic materials, such as polyvinyl chloride (PVC), at least partly due to the increased emphasis on recycling of plastics. For example, PVC has fallen out of favor in containers and other consumer applications, in large part due to its thermal instability and tendency to release chlorine gas during recycling, whereas PET is more readily recycled.

Full body shrink-sleeve labels have also become a popular choice for use on food and beverage containers, e.g., PET bottles. They have proven to be convenient for the consumer, and commercially attractive to brand owners. However, despite broad market acceptance, full body shrink-sleeve labels present difficulties for the recycling industry. For example, when recycling post-consumer PET bottles, bottles and labels contained thereon enter the recycling process together and are very difficult to separate downstream. Further complications arise if the inks printed on the labels, or directly on the bottles, dissolve in the hot caustic wash typically used in the recycling processes. This can contaminate the wash solution, which in turn can cause staining of the polyester flake being generated for re-use. Tinting of the flake downgrades its quality, thereby reducing the value of the recycled PET flake. This can also lead to increased wastewater treatment cost and potential environmental issues with municipal water sources.

Of the films typically used to produce full body shrink sleeve labels, PETG (polyethylene terephthalate glycol) is problematic for recyclers due its tendency to sink along with the PET from the bottles, typically in flake form, during treatment with the hot caustic wash. The PET flake is then prone to clumping, making it very difficult to separate and remove from the process. A new class of polymers, crystallizable PETG resin, was developed by companies like SKC films and Eastman Chemical, among others, which has been shown to be fully recyclable together with the PET flake from the bottles. However, issues remain regarding removing the ink from bottles and labels without causing tinting of the recycled polymer.

U.S. Pat. No. 6,147,041 discloses the removal of certain inks from printed articles, such as plastic bottles and shrink labels, by exposure to an aqueous solution of up to 3% NaOH in hot water, typically at about 80° C. to 90° C., wherein the ink compositions comprise (A) a urethane resin and/or an acrylic resin and (B) one or more substances selected from the group consisting of styrene-acrylic acid copolymers, styrene-maleic acid resins, rosin-maleic acid resins and phenol resins as main components of an ink vehicle. The inks of U.S. Pat. No. 6,147,041 contain an organic solvent "as an essential component". Solvent-based inks are widely used when plastic articles are intended for recycling. This is consistent with the current state of the art in ink technology that holds that water-based inks are not resistant to NaOH solutions and will solubilize in the hot caustic wash used in recycling processes. U.S. Pat. No. 6,147,041 is silent regarding the use of PETG or crystallizable PETG in labels.

EP2987822 discloses a method for removing print from printed PETG substrates by treating a printed PETG composition with a treatment containing an aqueous azeotrope of an organic polar solvent having low molecular weight, selected from the group consisting of ketones, aldehydes, alcohols and esters. The treating composition can be applied to the substrate by rubbing, agitating, mixing or dipping the chopped substrate in the treating composition. However, EP2987822 fails to disclose crystallizable PETG resin for use on labels. Further, the likelihood of repeated treatments with the aqueous azeotrope makes the method of EP2987822 cumbersome, and the use of solvents in the 'treatment' raises environmental issues.

WO 2021/081288 discloses ink compositions that will not contaminate and stain plastic materials when removed by a hot caustic wash solution during recycling, because instead of dissolving in the hot caustic wash solution, the inks form a solid or precipitate. The solid or precipitate can then be easily separated from the recycled plastic and wash solution, such as by filtration. The ink compositions of WO 2021/081288 comprise: (a) a resin selected from the group consisting of: polyvinyl chloride-polyvinyl acetate copolymer, semi-aliphatic polyurethane, polymethyl methacrylate copolymer, isobutyl methacrylate copolymer, cellulose-based resins, styrene maleic anhydride copolymer, and combinations thereof; (b) an organic solvent; and (c) a colorant resistant to dissolving in a hot caustic solution.

Water-based compositions containing self-crosslinking polymers, e.g., self-crosslinking acrylic copolymers are known. GB2045768 discloses an aqueous magnetic recording medium comprising a dispersion of magnetizable particles in a water-based latex binder. A typical binder is a self-crosslinking copolymer produced as the emulsion polymerization product of a monomer mixture primarily comprising lower alkyl (meth)acrylate monomers, minor amounts of (meth)acrylic acid, and glycidyl (meth)acrylate. By employing a water-based binder, pollution and fire hazards are avoided.

US Patent Appl. Pub. No. US 2017/0275483 discloses a printing ink or coating composition comprising a self-crosslinking acrylic copolymer having a glass transition temperature of greater than 0° C., a coalescent, and a silicone emulsion, a process for preparing a coated substrate, in particular a polyboard substrate, and an article made from the coated substrate, such as a milk or juice carton. The printing inks and coating compositions are water-based, which provides for improved pigment wetting allowing the printing inks and coating compositions to contain less colorant, thus allowing for higher amounts of varnish. This in turn provides for maximum resistance while retaining color strength.

An improved method for removing inks from polymers, such as PET and PETG, during recycling without causing staining or tinting of the recycled polymer is needed. Preferably, the method can make use of a water-based ink in light of the discussion above.

Applicant has found that during a recycling process, water-based inks comprising certain acrylic or urethane polymers, such as self-crosslinking acrylic polymers, can be removed in the form of solid particles from polymer substrates, e.g., polyethylene terephthalate containers, labels, etc., in a hot caustic wash, without dissolving and without contaminating the recycled polymer. In many embodiments, the inks contain colorants that are resistant to the hot caustic wash, and which also can be removed as solids.

BRIEF SUMMARY OF THE INVENTION

The present invention provides a method for recycling printed plastic articles without contaminating or staining the plastic with color due to the initial presence of the ink.

One embodiment is a method for producing recycled plastic material from a recyclable plastic article, such as a plastic container, comprising the recyclable plastic material and a water-based ink, which is applied directly to the article, e.g., container, or to a label attached thereto, wherein the recycled plastic material is not stained or contaminated by the water-based ink during the recycling process.

One broad embodiment of the method comprises:
a) providing a plastic container having:
   a surface which has been printed on with a water based ink, and/or
   a label which has been printed on with a water-based ink;
      wherein the water based ink comprises i) water and ii) a polymer, typically a self-crosslinking acrylic copolymer or polyurethane resin, e.g., a polyester urethane resin,
      which inks are removable in the form of solid particles in hot caustic wash but are not dissolved by the hot caustic wash;
b) immersing the container, and label if present, in a hot caustic wash to remove the inks and colorant if present as a particulate or precipitate that is essentially insoluble in the caustic wash;
c) removing the recyclable plastic from the hot caustic wash;
d) grinding the recyclable plastic from the container into clear recycled plastic flake having minimal discoloration;
   wherein the hot caustic wash is typically an aqueous solution of up to 3% NaOH and/or non-ionic surfactant, at about 70° C. to about 95° C., typically about 80° C. to about 90° C., e.g., about 85° C.

Typically, the ink compositions comprise one or more colorants that are resistant to dissolving in caustic solution. In some cases the printed, recyclable substrate, e.g., article, container, polymer fragment, flake, etc., may be immersed for multiple hours, but the immersion time is typically less than 2 hours, e.g. 1 hour or less, such as 45 minutes or less, 30 minutes or less, or 15 minutes or less. In many embodiments, the ink further comprises a coalescent and silicone emulsion.

In one embodiment, the plastic material of the container is PET or PETG and the label, if present, comprises PET, PETG or crystallizable PETG.

In a broad embodiment, the polymer of the ink is a self-crosslinking acrylic copolymer, typically in the form of an aqueous dispersion or emulsion, produced as the product of at least two monomers. For example, the self-crosslinking acrylic copolymer is formed from reactive monomers, which include at least one monomer selected from the group consisting of methyl acrylic acid (MAA); methyl methacrylate (MMA); butyl acrylate; butyl methacrylate; styrene; methyl styrene; N-hydroxymethyl acrylamide, N-alkoxymethyl acrylamide, and combinations thereof.

The self-crosslinking acrylic polymer generally has a glass transition temperature of 20° C.-70° C. The ink compositions often comprise 20-70 wt % of acrylic polymer, based on the total weight of the composition, wherein 55-75 wt % of the acrylates are self-crosslinking.

In many embodiments the coalescent is in the form of an emulsion present from 2 wt % to 20 wt %, e.g., 5 wt % to 15 wt %, based on the total weight of the composition, and has a glass transition temperature of less than 20° C. For example, the coalescent is an acrylic emulsion and has a glass transition temperature of less than 20° C., often less than 0° C.

The ink composition also typically comprises from 0.2 wt % to 3 wt %, e.g., from 1 wt % to 2 wt %, based on the total weight of the composition, of a silicone emulsion.

Also provided by the invention is a recyclable plastic container e.g., PET container, that has been printed on with the inks of the invention; a recyclable plastic container, e.g., PET container, comprising having an attached PETG label, e.g., crystallizable PETG label, that has been printed on with the inks of the invention, and a method for preparing the recyclable plastic, container, with or without the label.

These and other objects, advantages, and features of the invention will become apparent to those persons skilled in the art upon reading the details of the formulations and methods as more fully described below.

DETAILED DESCRIPTION OF THE INVENTION

One embodiment of the present invention provides a method that enables a printed plastic container and/or printed label, to be fully recyclable. According to the invention, certain water-based inks used to print the container and/or label are removable in the form of solid particles in a hot caustic wash (NaOH solution). The inks do not dissolve in the wash, and therefore there is no staining of the recycled plastic. In many embodiments, the use of the present inks allows one to separate the major components of the printed plastic container and/or printed label, e.g., plastic substrates, ink carrier, and colorant as solids, by a series of filtrations.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of ordinary skill in the art to which the invention belongs. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

When the terms "consist of", "consists of" or "consisting of" is used in the body of a claim, the claim term set off with "consist of", "consists of" and/or "consisting of" is limited to the elements recited immediately following "consist of", "consists of" and/or "consisting of", and is closed to unrecited elements related to that particular claim term. The term 'combinations thereof', when included in the listing of the recited elements that follow "consist of", "consists of" and/or "consisting of" means a combination of only two or more of the elements recited.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes all values within that range, and all narrower ranges within that range, whether specifically recited or not.

As used herein, the terms "(meth)acrylate," "(meth)acrylic acid," or "acrylate" include both acrylate and methacrylate compounds, and both acrylic acid and methacrylic acid, unless specified otherwise.

As used herein, the term "binder" means a polymeric or resinous component that helps bind ink components to each other and to the printed substrate. The binder can be one polymeric or resinous component, or a combination of more than one polymeric or resinous component. The binder may serve to adhere the pigment to the substrate, or to keep a pigment uniformly dispersed in a fluid ink vehicle. When referring to the amount of binder in a composition, it refers to the weight of the material used, including the actual binder resin and any diluents or other additives present in the form in which it is used (e.g., binder in ethanol), when the recited weight is based on the total weight of the composition. When the amount of binder is recited on a solid weight basis, this refers to the amount of the actual resin (solids), after the other components (e.g., ethanol) are removed. For example, a composition may comprise 30 wt % of binder material which is a 25% solids solution in ethanol, based on the total weight of the composition. The actual binder resin (solids) that is present based on a solid weight basis is 30(0.25)=7.5 wt %.

As used herein, the term "polymer" includes both homo- and co-polymers.

As used herein, the terms "water-based ink or coating composition(s)," "water-based coating compositions(s)," "water-based ink composition(s)," "water-based coating(s)," "water-based ink(s)," "coating(s)," "coating composition(s)," "ink(s)", "ink compositions(s)," "compositions" and the like are used interchangeably. As used herein, coatings and related terms include inks, and vice-versa.

As used herein, the term "article" or "articles" means a substrate or product of manufacture. Examples of articles include, but are not limited to: substrates such as containers (e.g., bottles, cans), a polyolefin (e.g., polyethylene or polypropylene), a polyester (e.g., polyethylene terephthalate), metalized polyester, and the like.

Throughout this disclosure, all parts and percentages are by weight (wt % or mass % based on the total weight) and all temperatures are in ° C. unless otherwise indicated.

The terms "hot caustic bath", "hot caustic wash" and "hot caustic solution" are defined as an aqueous solution containing 1.0% to 3.0% by weight NaOH at a temperature of 70° C. to 95° C., e.g., 80° C. to 95° C., or 80° C. to 90° C. The terms are used interchangeably herein. Further, the hot caustic bath, wash or solution may contain surfactant, such as non-ionic surfactant, in an amount of 0.1 wt % to 1.0 wt %. In the testing of the described ink compositions reported in this paper, the "hot caustic bath" or "hot caustic solution" is an aqueous solution comprising 2.0% by weight NaOH at a temperature of 85° C.

Compositions and Methods

The present invention makes use of self-crosslinking polymers. Crosslinking involves chemically joining two or more polymer chains by covalent bonds and often involves two or more compounds, e.g., a crosslinkable polymer and a crosslinking agent or chain extender. In a process distinct from similar 2K systems, in the present invention self-crosslinking systems involve attaching the crosslinking agent to the polymer backbone in the resin. The polymers can then bond to each other directly.

One particular embodiment of the present invention provides a method for recycling plastic containers comprising water-based ink compositions (or container labels comprising water-based ink compositions) comprising the following steps;

1. Providing recyclable plastic containers comprising water-based ink compositions (or container labels comprising water-based ink compositions), which inks have been formulated to be removable from the container (or label) as a particulate precipitate in an aqueous caustic solution, typically heated at temperatures of from about 70° C. to about 95° C., e.g., from about 80° C. to about 90° C., such as about 85° C., in which solution the inks are insoluble;
2. Removing the inks from the container or label by immersion in the caustic wash as a particulate precipitate. At this point the recycling mixture comprises the aqueous wash, the solid container, or pieces of the solid container, container labels if included with the container, solid ink particles and, in most embodiments, the colorant from the ink, also in solid form;
3. Separating at least the recyclable container, either intact or as pieces of recyclable plastic, from the recycling mixture, typically by filtration;

4. Grinding the recyclable container into clear recycled flake, the resultant flake having minimal discoloration.

In step 3, the container, or pieces of recyclable plastic from the container if the container was originally cut into smaller pieces before recycling, are separated from the recycling mixture. This can be conveniently done by filtration. Although the recycling mixture contains multiple solids, the solid materials, i.e., the container or pieces of recyclable container plastic, the ink composition, the colorant, are of different sizes. In general, the recyclable container or recyclable plastic pieces will have the largest size and selecting a filter with the proper pore size will allow all but the largest solid material to pass through.

The present method often allows for convenient isolation of each of the above solid components from the caustic solution based on size. This would allow each component, including the caustic solution, to be isolated and/or reused or appropriately disposed of in an environmentally sound manner. For example, one can isolate the smallest, or largest material in a first filtration, by using a filter with a relatively large or relatively small pore size, then separate the remaining solids in a second filtration using a filter with a different pore size. WO 2021/081288, which uses an entirely different ink, illustrates a similar filtration method, for example, FIGS. 6a through 6C.

The recyclable plastic of the container could be any used for this purpose, including HDPE, PET, PETG, styrene, etc. In an exemplary embodiment, the plastic bottle is PET and the label is crystallizable PETG.

The ink compositions employed in the inventive method comprise water and a polymer, and in many embodiments a coalescent, silicone emulsion and colorant as described below:

Water

The inks are water based. It is possible that some organic solvent or solvents are present, but the majority of any water/organic solvent mixture present in the ink is water. Solvents include, for example, aliphatic hydrocarbons, cyclic hydrocarbons, aromatic hydrocarbons, ketones, aldehydes, alcohols, ethers and esters, e.g., ketones, alcohols, ethers and esters. In a preferred embodiment, the solvents would meet the various regulatory standards such as EuPIA, REACH, Swiss Ordinance, Nestle, Canada, Japan, China and Australia NZ inventories.

Polymer

Good results were obtained with polyurethane or a self-crosslinking acrylic polymer. For example, excellent results were obtained when using an aliphatic, polyester-based polyurethane or a self-crosslinking acrylic polymer. A particularly useful polymer is a self-crosslinking acrylic copolymer with a glass transition (Tg) temperature of about 20 to about 70° C., e.g., about 40 to about 60° C. The self-crosslinking acrylic polymer is usually in the form of an aqueous dispersion or emulsion formed as the product of at least two monomers that react with one another.

The self-crosslinking acrylic copolymer of the invention is a 1-part acrylic that can achieve curing under ambient temperature, typically via a carbonyl/amine reaction. This can occur between carbonyl groups, e.g., carboxy, keto, or aldehyde groups, present in the copolymer and amine groups, also present in the copolymer, that are reactive towards the carbonyl groups. These acrylic copolymers exhibit enhanced resistance and adhesive properties in the resultant dried film. Despite exhibiting this enhanced resistance under most conditions, these cured copolymers are readily removed as solid particles in a hot caustic bath or wash.

Self-crosslinking acrylic polymers may include, for example, binders selected from the group consisting of styrene-acrylic ester copolymer, a styrene/acrylic ester copolymer containing acrylamide groups and preferably a copolymer based on acrylonitrile, methacrylamide and acrylic ester.

The crosslinking reaction, depending upon the acrylic type, may be initiated by the evaporation of water upon drying, a change of pH of the vehicle or by curing at elevated temperatures where the cross-linking reaction occurs faster or protected reactive groups are de-blocked. Typically, the self-crosslinking acrylic polymer is formed from reactive monomers which include at least one monomer selected from methyl acrylic acid (MAA), methyl methacrylate (MMA), butyl acrylate, butyl methacrylate, styrene, methyl styrene, N-hydroxymethyl acrylamide, and N-alkoxymethyl For example, the self-crosslinking acrylic polymer may be a styrene/acrylic ester copolymer, and, in one particular embodiment, the self-crosslinking styrene/acrylic ester copolymer further comprises an N-hydroxymethyl acrylamide monomer or N-alkoxymethyl acrylamide monomer, e.g., N-isobutoxy methylacrylamide (NiBMA). In this particular embodiment, the crosslinking reaction can occur between a carbonyl group and the nitrogen of the amide group.

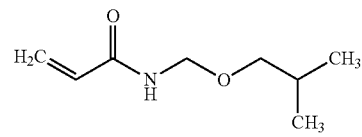

NiBMA = N-Isobutoxy Methylacrylamide

Examples of commercial, self-crosslinking acrylates formed from such monomers include ALBERDINGK AC2714VP, SYNTHOMER AM00035, ORGANIKKIMYA ORGAL PO86V and DSM NEOCRYL XK12 & 14.

Coalescent

In many embodiments the ink or coating contains a coalescent. Almost any coalescent may be used; however, the coalescent advantageously is an acrylic emulsion and typically has a glass transition temperature of less than 20° C., advantageously less than 0° C. Usually, the ink compositions of the inventive method comprise between 2 to 20 wt % of coalescent and preferably between 5 to 15 wt % of coalescent Examples of commercial coalescents include DOW LUCIDENE 605, DSM NEOCRYL A1125 and A2095, and BASF JONCRYL 8052 and ECO2124.

Silicone Emulsion

The ink compositions of the inventive method often comprise a silicone emulsion, preferably a high molecular weight silicone emulsion. The addition of a silicone emulsion in the formulation helps to improve the overall resistance properties. Examples of commercially available silicones include DOW CORNING DC84, DC 51, DC 209S, and WORLEEADD 350 and KEIM-ADDITEC SILCO-GLIDE T53. These silicones are high molecular weight polydimethylsiloxane emulsion, containing reactive silanol groups. Alternatively, blocked reactive silicone emulsions may be used. Typically, the ink compositions of the inventive method comprise between 0.2 to 3 wt % of silicone emulsion and more preferably between 1 to 2 wt % of silicone emulsion.

Colorant

In many embodiments the inks of the inventive method comprise a colorant. Such colorants typically include organic and inorganic pigment dispersions and dyes. In many embodiments, the colorants are in the form of pigment dispersions, but it is understood that colorants could be introduced in other forms, e.g., as dry pigment that would then be dispersed in the liquid media of the inks and or coatings. Pigments that are not soluble in the caustic bath or wash are preferred. In many embodiments, the ink compositions of the inventive method comprise from about 5 to about 50 wt % of pigment dispersion, e.g., from about 20 to about 45 wt % of pigment dispersion and advantageously between 30 to 40 wt % of pigment dispersion.

Typically, the printing ink or coating composition comprises a standard acrylic base containing a pigment dispersion, in the amount of between 1 to 35 wt %, and a varnish containing the self-crosslinking acrylic copolymer, the coalescent and the silicone emulsion according to the present invention preferably in the amount of between 65 to 99 wt %.

Generally, the ink compositions of the inventive method comprise between 20 to 70 wt % of acrylic polymer, based on the total weight of the composition, of which 55 to 75 wt % is self-crosslinking.

The ink compositions of the inventive method may be used for any kind of printing, but they are advantageously suitable for gravure or flexographic printing.

Although not required, the ink compositions of the inventive method preferably have indirect food contact status, have been successfully migration tested and all the materials used therein are preferably Toxic Substances Control Act (TOSCA) and Food and Drug Administration (FDA) approved.

In a preferred embodiment, the inks used for printing the PETG label would comply with international regulatory specifications, such as EuPIA, REACH, Swiss Ordinance, Nestle, Canada, Japan, China and Australia NZ inventories.

The ink compositions of the inventive method preferably do not require aromatic solvents, such as toluene, or strong solvents, such as MEK, therefore widening the operating window for application on films sensitive to those solvents. It also broadens the window for printing processes other than gravure, such as flexographic and digital (inkjet).

The ink compositions of the inventive method minimize the risk of staining the recycled PET flake and contamination of wash waters. They are preferably fully removable from the printed surfaces to which they have been applied when those printed articles come in contact with hot caustic solution (typically containing up to 3% NaOH and/or non-ionic surfactant). The ink compositions of the inventive method preferably do not solubilize in the hot caustic solution, instead breaking down into small particles that precipitate and can be physically removed via filtration in a rinse step.

In many embodiments, the ink compositions of the inventive method have been formulated preferably for use on PETG or other suitable shrink films.

As with most ink and coating compositions, additives may be incorporated to enhance various properties. A partial list of such additives includes, but is not limited to, silicones, light stabilizers, de-gassing additives, ammonia, alcohols, flow promoters, defoamers, antioxidants, stabilizers, surfactants, dispersants, plasticizers, rheological additives, wetting aids, waxes, including polyethylene wax emulsions, wax dispersions, etc. In a preferred embodiment, the additives would meet the various regulatory standards such as EuPIA, REACH, Swiss Ordinance, Nestle, Canada, Japan, China and Australia NZ inventories.

Examples of such additives include isopropanol and n-propanol; polyethylene wax emulsions such as MUNZING LUBAPRINT 2036 and BYK AQUACER 531; wax dispersions such as MUNZING LUBAPRINT 499 and W5700, KEIM ULTRALUBE D816 and CRAYVALLAC WW1001; antifoams such as BYK 023 and EVONIK TEGOFOAMEX 1488; wetting aids such as EVONIK TEGOWET 500, BYK DYNWET 800 and AIR PRODUCTS SURFYNOL AD01; biocides such as ACTICIDE B20 from Thor Chemicals, and dispersants such as BYK DISPERBYK 190.

The printing ink may also include waxes, such as, but not limited to, polypropylene wax, paraffin wax, polyethylene wax, polytetrafluoroethylene (PTFE) wax, carnauba wax, amide wax, erucamide wax, and the like. The wax may be a combination of said waxes. It is preferred that the wax be a blend of amide and erucamide waxes. The wax, if present, is preferably in an amount of up to about 4 wt %. It is preferred that the wax be present in an amount from about 0 wt % to about 2 wt %. In a preferred embodiment, the waxes would meet the various regulatory standards such as EuPIA, REACH, Swiss Ordinance, Nestle, Canada, Japan, China and Australia NZ inventories.

In a preferred embodiment, the colorants in the ink compositions of the inventive method would be pigments that are resistant to dissolving in caustic solution. A partial list of such pigments includes the following in Table 1:

TABLE 1

Pigments resistant to dissolving in caustic solution

| Chemical Name | Description | Color Index |
|---|---|---|
| Diarylide Yellow AAMX | 2752180: SUNBRITE ® YELLOW 13 | 13 |
| Diarylide Yellow AAOT | 4744444: 01: SUNBRITE ® YELLOW 14 | 14 |
| Monoazo Yellow | R24-71: AKAFAST YELLOW FGL | 97 |
| Naphthol Red AS | 049-0678: TCR18403 PR184 | 184 |
| Naphthol Red RA | 4354438: SUNBRITE ® RED 269 | 269 |
| Phthalocyanine (C32H16CuN8) | 4483762: 01: SUNFAST ® BLUE 15 P/C | 15 |
| Phthalocyanine (C32H16CuN8-2) | 2490105: 01: SUNFAST ® BLUE 15: 4 | 15: 4 |
| Carbon Black | R6501: CABOT REGAL 660; BLACK 7 | 7 |
| Titanium Dioxide | 14-215: TRONOX CR-828 | 6 |

In another preferred embodiment, the pigments would meet the various regulatory standards such as EuPIA, REACH, Swiss Ordinance, Nestle, Canada, Japan, China and Australia NZ inventories.

In another preferred embodiment, the pigments would be FD&C or D&C pigments.

The ink compositions of the inventive method may contain the usual extenders such as clay, calcium carbonate, magnesium carbonate or silica. In a preferred embodiment, the extenders would meet the various regulatory standards such as EuPIA, REACH, Swiss Ordinance, Nestle, Canada, Japan, China and Australia NZ inventories.

The ink compositions of the inventive method are particularly suitable for use on crystallizable PETG films for full body shrink sleeve labels. Preferably, these inks can be easily removed from the labels via hot caustic solution during recycling process to allow the film to be fully recyclable.

The ink compositions of the inventive method are preferably substantially free of Bisphenol A (BPA) and are advantageously preferably substantially free of epoxy esters.

EXAMPLES

The invention is further described by the following non-limiting examples which further illustrate the invention, and are not intended, nor should they be interpreted to, limit the scope of the invention.

Description of Materials used in Ink Formation

Self-Crosslinking Acrylic Copolymers—many different acrylic polymers would be suitable for the present invention. Preferred materials include, e.g., Neocryl XK-14 or Joncryl 541: self-crosslinking, emulsifier free, acrylic copolymers with excellent water, detergent, and chemical resistance providing the core component for washability.

Polyurethane Dispersions—many different polyurethane dispersions would be suitable for the present invention. One preferred material is Neorez R-9330: An aliphatic, non-ionic polyester urethane dispersion designed to provide excellent wetting, film forming, adhesion properties to film and exceptional flexibility.

Acrylic Emulsions—non-limiting examples of suitable materials include:
  Joncryl ECO 2124: A very soft, ultra-low VOC, glycol ether-free acrylic emulsion for aqueous inks on film. Features include adhesion and flexibility for end use properties such as crinkle and tape adhesion. Originally designed for use in water-based flexographic and gravure inks, it displays good adhesion to polyethylene, polypropylene, and polyester films.
  HYDRIPRINT 605 NV: A very soft styrene-acrylic emulsion polymer with low Tg that displays outstanding adhesion and water resistance in inks and coatings. Compatible with a wide range of alcohols and glycol ether solvents and styrene/acrylic polymers used in the graphic arts industry.

Wax Emulsions—non-limiting examples of suitable materials include:
  Aquacer 531: A Non-ionic emulsion of a modified polyethylene wax. Improves scratch, abrasion, and blocking resistance in printing inks.
  Luba-print SC 5700: A polyethylene wax emulsion for improved slip properties and mar resistance in aqueous printing inks.
  Michem Lube 743: A Carnauba and paraffin-based wax emulsion with excellent compatibility in water-based applications. Provides water, mar and blocking resistance.

Defoamers—non-limiting examples of suitable materials include:
  Tego Foamex 1488: A very effective defoamer emulsion based on polyether siloxane technology. It provides foam-inhibiting properties and long-term effectiveness.
  BYK-094: A compound of foam destroying polysiloxanes and hydrophobic solids. Provides excellent long-term foam controlling efficiency.
  Dapro DF 975: A silicone-free waterborne defoamer based on a dispersion of olefinic solids. Imparts excellent foam control properties in printing inks.

Surfactants—non-limiting examples of suitable materials include:
  BYK Dynwet 800 N: A silicone-free, alcohol alkoxylates containing substrate wetting agent for aqueous printing inks. It reduces the dynamic surface tension and therefore improves substrate wetting on film applications.
  Surfynol 440: A nonionic ethoxylated acetylenic surfactant that is employed for substrate wetting. Offers good foam control with a moderate solubility in aqueous systems.

Silicones—non-limiting examples of suitable materials include:
  DOWSIL 51 Additive: An ultra-high-molecular-weight polydimethyl silicone dispersion that imparts slip and mar resistance in aqueous systems.
  SILCO GLIDE T-52: An ultra-high molecular weight silicone dispersion to improve slip, abrasion, blocking, and rub resistance in aqueous systems.

Amines—optional, especially useful in white ($TiO_2$-containing) inks to improve grinding efficiency—non-limiting examples of suitable materials include:
  Dimethylaminoethanol: Primarily used as a pH control agent in aqueous systems.
  Depending on customer/conditions, Monoethanolamine, Triethanolamine, and Diethylethanolamine.

Solvents—non-limiting examples of suitable materials include:
  Isopropyl Alcohol: contributes to increased drying speed and print quality for aqueous inks on film.
  Depending on customer/conditions, Normal Propyl Alcohol, Ethanol, and Propylene Glycol.

Test Methods

In the following Examples, test labels are coated using a Harper QD bladed flexo handproofer, Meyer gravure rod, or Geiger gravure cylinder. Unless otherwise specified, a Harper QD bladed flexo handproofer was used.

The test labels may consist of polyethylene terephthalate (PET), polypropylene (PP), or polyolefin (POF). Unless otherwise specified, the test labels consist of polyethylene terephthalate (PET).

In a typical coating/printing process, a four inch wide strip of PET was taped to a benchtop with tension to eliminate potential wrinkles or creases. After engaging the doctor blade on the Harper handproofer, a water-based ink was used to fill the cells of the Harper anilox. With the Harper handproofer at a 20° angle, medium pressure was applied while pulling the handproofer along the surface of the substrate. Once the film had been printed, heat was applied to the coated/printed surface using a heat gun. The desired web temperature was approximately 140° F. to ensure print curing.

Simulation of European (EPBP) recycling of post-consumer PET bottles to simulate the process of recycling PET bottles with printed labels on shrinkable film such as Crystallizable PET:
  75 $cm^2$ of printed labels coated individually with the inks of Examples 1-6 are cut into 0.64 cm×0.64 cm pieces and blended with 37.5 grams of clean PET flake.
  A beaker with 300 mL of caustic solution composed of 6 grams of NaOH is subjected to heat on a hot plate until it reaches 85° C.

When the caustic solution in the beaker reaches 85° C., the mixture of label and PET flake are introduced into the hot caustic water and stirred for 45 minutes at 1000 rpm with a benchtop mixer.

After 45 minutes, the beaker is removed from the heat source and the hot caustic wash solution and flakes are strained through a filter (sieve or organdy cloth). The solution is collected in a glass jar.

The flakes are rinsed until the rinse is clear or minimally discolored and the flakes are allowed to dry.

Once the PET flakes are dry, L* a* b* color values are measured using an X-rite spectrophotometer on the PET flakes. Measurements are taken as an average reading of 10 flakes. Flatter flakes are preferably chosen for better spectrophotometer readability.

A control is prepared in the same manner, except without the label pieces. This produces PET flakes and wash that are devoid of any discoloration from ink.

Collection of Spectrophotometer Data

Recycled PET flake readings were measured using an X-Rite exact or X-Rite Spectroeye. X-Rite Color Quality software was used for color data collection. After the washing and rinsing process, the recycled PET flakes were compressed on a white backing sheet and scanned using an X-Rite spectrophotometer. Five individual flakes of recycled PET are chosen and scanned for an averaged reading. Points of interest are Delta L (±5.0), Delta a (±1.5), and Delta b (±1.5). Once all flakes are measured, the average of each is calculated and compared to clean, untested flake.

Target values for color change of the PET flakes vs. the control as established by the APR (Association of Plastics Recyclers) is as follows:

ΔL: <5.0
Δa: <1.5
Δb: <1.5

Note: it is not an absolute requirement that the flake produced with the inventive method of the present invention meet these ΔL, Δa, Δb values for color change. For some applications, a wider range may be acceptable, for example:

ΔL: <7.5 or 10.0
Δa: <2.0 or 2.5
Δb: <2.0 or 2.5

EXAMPLES OF WATER-BASED PRINTING INKS

Example 1: Cyan Based on Self-Crosslinking Acrylic Polymer

| Material | Description | wt % |
| --- | --- | --- |
| Self-Crosslinking Acrylic Polymer | Neocryl XK-14 | 39.6 |
| Acrylic Emulsion | Joncryl ECO 2124 | 7.0 |
| Blue 15: 3 Acrylic Dispersion | Flexiverse[1] 15 Blue | 40.0 |
| Wax Emulsion | Aquacer 531 | 9.8 |
| Defoamer | Tego Foamex 1488 | 0.2 |
| Surfactant | BYK Dynwet 800 N | 1.0 |
| Silicone | Silco Glide T52 | 0.4 |
| Isopropyl Alcohol | | 2.0 |
| Total | | 100.0 |

[1]Flexiverse is the trade name for Sun Chemical acrylic color dispersions

Example 2: Magenta Based on Self-Crosslinking Acrylic Polymer

| Material | Description | wt % |
| --- | --- | --- |
| Self-Crosslinking Acrylic Polymer | Neocryl XK-14 | 39.6 |
| Acrylic Emulsion | Joncryl ECO 2124 | 7.0 |
| Red 269 Acrylic Dispersion | Flexiverse Red 269 | 40.0 |
| Wax Emulsion | Aquacer 531 | 9.8 |
| Defoamer | Tego Foamex 1488 | 0.2 |
| Surfactant | BYK Dynwet 800 N | 1.0 |
| Silicone | Silco Glide T52 | 0.4 |
| Isopropyl Alcohol | | 2.0 |
| Total | | 100.0 |

Example 3: Yellow Based on Self-Crosslinking Acrylic Polymer

| Material | Description | wt % |
| --- | --- | --- |
| Self-Crosslinking Acrylic Polymer | Neocryl XK-14 | 39.6 |
| Acrylic Emulsion | Joncryl ECO 2124 | 7.0 |
| Yellow 13 Acrylic Dispersion | Flexiverse Yellow 13 | 40.0 |
| Wax Emulsion | Aquacer 531 | 9.8 |
| Defoamer | Tego Foamex 1488 | 0.2 |
| Surfactant | BYK Dynwet 800 N | 1.0 |
| Silicone | Silco Glide T52 | 0.4 |
| Isopropyl Alcohol | | 2.0 |
| Total | | 100.0 |

Example 4: Black Based on Self-Crosslinking Acrylic Polymer

| Material | Description | wt % |
| --- | --- | --- |
| Self-Crosslinking Acrylic Polymer | Neocryl XK-14 | 33.0 |
| Acrylic Emulsion | Joncryl ECO 2124 | 6.0 |
| Black 7 Acrylic Dispersion | Flexiverse Black 7 | 50.0 |
| Wax Emulsion | Aquacer 531 | 8.3 |
| Defoamer | Tego Foamex 1488 | 0.3 |
| Surfactant | BYK Dynwet 800 N | 1.0 |
| Silicone | Silco Glide T52 | 0.4 |
| Isopropyl Alcohol | | 1.0 |
| Total | | 100.0 |

Example 5: Water-Based Washable White Based on Self-Crosslinking Acrylic Polymer

| Material | Description | wt % |
| --- | --- | --- |
| Self-Crosslinking Acrylic Polymer | Neocryl XK-14 | 51.0 |
| Defoamer | Dapro DF 975 | 0.5 |
| Dimethylaminoethanol | DMEA | 1.0 |
| Titanium Dioxide | Tioxide RDE2 | 40.0 |
| Wax Emulsion | Aquacer 531 | 4 |
| Silicone | Silco Glide T52 | 0.5 |
| Surfactant | BYK Dynwet 800 N | 1.0 |
| Isopropyl Alcohol | | 2.0 |
| Total | | 100.0 |

Example 6: Water-Based Washable White Based on Polyurethane

| Material | Description | wt % |
|---|---|---|
| Polyurethane Dispersion | Neorez R-9330 | 51.0 |
| Defoamer | Dapro DF 975 | 0.5 |
| Dimethylaminoethanol | DMEA | 1.0 |
| Titanium Dioxide | Tioxide RDE2 | 40.0 |
| Wax Emulsion | Michem Lube 743 | 4 |
| Silicone | Dowcil 51 | 0.5 |
| Surfactant | Surfynol 440 | 1.0 |
| Isopropyl Alcohol | | 2.0 |
| Total | | 100.0 |

Comparative Example: Cyan Based on Non Self-Crosslinking Acrylic Polymer

| Material | Description | wt % |
|---|---|---|
| Acrylic Emulsion | Joncryl 537 | 51.1 |
| Acrylic Emulsion | 55-V-620A: SMA Varnish | 6.0 |
| Blue 15: 3 Acrylic Dispersion | Flexiverse[1] 15 Blue | 40.0 |
| Wax Compound | 59-K-21PE | 1.2 |
| Defoamer | BYK-094 | 0.1 |
| Surfactant | Surfynol 104H | 0.3 |
| Silicone | Dowsil 51 | 0.4 |
| Glycol Ether | Glycol Ether DPM | 0.9 |
| Total | | 100.0 |

[1]Flexiverse is trade name for Sun Chemical acrylic color dispersions

Table 2 clearly shows the minimal discoloration of the flakes produced with the method of the present invention. All of the ΔL, a, b values are well below the target threshold. The comparative Example shown based on a Non Self-Crosslinking Acrylic Polymer, and other examples based on a Non Self-Crosslinking Acrylic Polymer failed the color test.

TABLE 2

ΔL, Δa, Δb values for color change vs. control

| Inventive Washable Ink | ΔL | Δa | Δb |
|---|---|---|---|
| Ex. 1 Cyan | 0.24 | −0.05 | 0.18 |
| Ex. 2 Magenta | 0.06 | 0.15 | 0.18 |
| Ex. 3 Yellow | −0.21 | 0.02 | 0.12 |
| Ex. 4 Black | −1.22 | 0.19 | 0.17 |
| Ex. 5 White | 0.14 | 0.07 | 0.21 |
| Ex. 6 White | 0.29 | 0.03 | 0.12 |

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. A method for recycling plastic material from a container, wherein the container comprises said plastic material, and wherein a water based ink is applied either directly to the container or to a label attached to the container, the method comprising a) providing a plastic container comprising
a surface which has been printed on with a water based ink, or
a label which has been printed on with a water based ink;
wherein the water based ink comprises i) water and ii) a polymer selected from a self-crosslinking acrylic copolymer resin or an aliphatic, non-ionic, polyester polyurethane based resin dispersion in water,
wherein the self-crosslinking acrylic copolymer resin comprises a polymer backbone,
wherein the self-crosslinking acrylic copolymer resin comprises a crosslinking agent attached to the polymer backbone in the resin,
which ink is removable in the form of solid particles but are not dissolvable in hot caustic wash; and
wherein the majority of any water/organic solvent mixture present in the ink is water;
b) immersing the container in a hot caustic wash to remove the inks as a particulate precipitate that is essentially insoluble in the caustic wash;
c) separating the plastic material of the container from the ink precipitate and the hot caustic wash;
d) grinding the recyclable container into clear recycled plastic flake;
wherein the clear recycled plastic flake has Δ values when compared to virgin flake of:
ΔL: <10
Δa: <2.5
Δb: <2.5;
wherein the plastic material is not stained or contaminated by the water based ink during recycling; and
wherein the hot caustic wash is an aqueous solution of from 1 wt % to 3 wt % NaOH and/or non-ionic surfactant, at from 70° C. to 95° C.

2. The method of claim 1, wherein the plastic material of the container is PET and the label is made from crystallizable PETG.

3. The method of claim 1, wherein the ink further comprises a coalescent and silicone emulsion.

4. The method of claim 1, wherein the ink further comprises one or more colorants that are resistant to dissolving in caustic solution and which colorants are also separated from the plastic material of the container in step c).

5. The method of claim 1, wherein the polymer is a self-crosslinking acrylic copolymer resin.

6. The method of claim 5, wherein the self-crosslinking acrylic copolymer is in the form of an aqueous dispersion.

7. The method of claim 5, wherein the self-crosslinking acrylic copolymer is selected from the group consisting of self-crosslinking styrene-acrylic ester copolymers; self-crosslinking styrene/acrylic ester copolymer containing acrylamide groups; self-crosslinking copolymers based on acrylonitrile, methacrylamide and acrylic ester; and combinations thereof.

8. The method of claim 5, wherein the self-crosslinking acrylic polymer is formed from reactive monomers which include at least one monomer selected from the group consisting of methyl acrylic acid (MAA); methyl methacrylate (MMA); butyl acrylate; butyl methacrylate; styrene; methyl styrene; N-hydroxymethyl acrylamide, and N-alkoxymethyl and combinations thereof.

9. The method of claim 5, wherein the self-crosslinking acrylic polymer is a styrene/acrylic ester copolymer.

10. The method of claim 9, wherein the self-crosslinking acrylic copolymer further comprises an acrylic monomer with a pendent N-methylol or N-alkoxymethyl group.

11. The method of claim 1, wherein the self-crosslinking acrylic polymer has a glass transition temperature of 20-70° C.

12. The method of claim 3, wherein the ink comprises 2-20 wt % of coalescent.

13. The method of claim 12, wherein the coalescent is an acrylic emulsion and has a glass transition temperature of less than 20° C.

14. The method of claim 1, wherein the ink comprises 20-70 wt % of acrylic polymer, of which 55-75 wt % is self-crosslinking.

15. The method of claim 1, wherein the ink further comprises one or more additives selected from the group consisting of wetting aids, alcohols, waxes, polyethylene wax emulsions, wax dispersions, antifoams, ammonia, defoamers, dispersants, stabilizers, silicones, rheological modifiers, plasticizers and combinations thereof.

16. The method of claim 1, wherein the ink is suitable for gravure or flexographic printing.

17. The method of claim 1, wherein the ink has indirect food contact status.

18. The method of claim 1, wherein the resultant clear recycled plastic flake has Δ values when compared to virgin flake of:
 ΔL: <5.0
 Δa: <1.5
 Δb: <1.5.

* * * * *